US012631816B2

(12) United States Patent
Wang et al.

(10) Patent No.: US 12,631,816 B2
(45) Date of Patent: May 19, 2026

(54) LIGHT-GUIDE SUNROOF ASSEMBLY

(71) Applicant: ENFLEX CORPORATION, Taoyuan City (TW)

(72) Inventors: Jyh Horng Wang, Taoyuan City (TW); Hsin Yuan Chen, Taoyuan City (TW); Jui Lin Hsu, Taoyuan City (TW); Chih Teng Ku, Taoyuan City (TW); Lung Hsiang Peng, Taoyuan City (TW)

(73) Assignee: ENFLEX CORPORATION, Taoyuan City (TW)

( * ) Notice: Subject to any disclaimer, the term of this patent is extended or adjusted under 35 U.S.C. 154(b) by 73 days.

(21) Appl. No.: 18/900,715

(22) Filed: Sep. 28, 2024

(65) Prior Publication Data

US 2025/0020857 A1     Jan. 16, 2025

Related U.S. Application Data

(63) Continuation of application No. 17/035,316, filed on Sep. 28, 2020, now abandoned.

(30) Foreign Application Priority Data

Oct. 18, 2019     (TW) ................................. 108137743

(51) Int. Cl.
*F21V 8/00*          (2006.01)
*B32B 1/00*          (2006.01)
(Continued)

(52) U.S. Cl.
CPC .............. *G02B 6/0065* (2013.01); *B32B 1/00* (2013.01); *B32B 3/02* (2013.01); *B32B 3/06* (2013.01);
(Continued)

(58) Field of Classification Search
CPC . B60J 7/043; B60Q 3/62; B60Q 3/208; G02B 6/0065; B29C 48/17; B29C 48/16;
(Continued)

(56) References Cited

U.S. PATENT DOCUMENTS 11,685,237 B2 *    6/2023    Chen ..................... B29C 51/266
                                                                428/99
2007/0098969 A1 *    5/2007    Ansems ............ B32B 17/10339
                                                                428/212
(Continued)

FOREIGN PATENT DOCUMENTS

DE          102011117796 A1 *    5/2013    .............. B60J 10/70
JP              6818104 B1 *    1/2021    .............. B32B 3/02
KR          20200020028 A *    2/2020    .............. B60J 1/08

*Primary Examiner* — Matthew J Daniels
(74) *Attorney, Agent, or Firm* — Raymond Sun

(57)          ABSTRACT

A light-guide sunroof assembly comprises a plastic substrate and a light source module furnished besides the plastic substrate. An outer layer of the plastic substrate is added with dye to form a colored background. A plurality of light-guide microstructures is furnished on the plastic substrate to guide the light generated by the light source module toward an inner surface of the plastic substrate. Thereby, the light generated by the light source module is guided by the plastic substrate and then ejects out of the inner surface of plastic substrate, so as to provide a light decoration or lighting effect that enriches the visual experience. Moreover, the plastic substrate is first formed into a curved plastic plate through a hot pressing process, and then a connecting structure is formed and fixed on the plastic plate by an insert-molding injection process, in order to replace the traditional car sunroof mechanism which is assembled by glass plate bonded with metal connecting parts.

7 Claims, 9 Drawing Sheets

(51) Int. Cl.

| | |
|---|---|
| *B32B 3/02* | (2006.01) |
| *B32B 3/06* | (2006.01) |
| *B32B 3/26* | (2006.01) |
| *B32B 3/30* | (2006.01) |
| *B32B 7/023* | (2019.01) |
| *B32B 7/04* | (2019.01) |
| *B32B 27/20* | (2006.01) |
| *B32B 27/30* | (2006.01) |
| *B32B 27/36* | (2006.01) |
| *B60J 7/043* | (2006.01) |
| *B60Q 3/208* | (2017.01) |
| *B60Q 3/62* | (2017.01) |
| *B29C 45/14* | (2006.01) |

(52) U.S. Cl.
CPC ................ *B32B 3/266* (2013.01); *B32B 3/30* (2013.01); *B32B 7/023* (2019.01); *B32B 7/04* (2013.01); *B32B 27/20* (2013.01); *B32B 27/308* (2013.01); *B32B 27/365* (2013.01); *B60J 7/043* (2013.01); *B60Q 3/208* (2017.02); *B60Q 3/62* (2017.02); *G02B 6/0003* (2013.01); *G02B 6/004* (2013.01); *B29C 45/14688* (2013.01); *B32B 2255/10* (2013.01); *B32B 2255/26* (2013.01); *B32B 2307/4026* (2013.01); *B32B 2307/412* (2013.01); *B32B 2307/422* (2013.01); *B32B 2307/536* (2013.01); *B32B 2307/554* (2013.01); *B32B 2307/71* (2013.01); *B32B 2551/00* (2013.01); *B32B 2605/00* (2013.01); *B32B 2605/006* (2013.01)

(58) Field of Classification Search
CPC ................ B29C 45/1679; B29C 43/40; B29C 2043/188; B29C 43/16; B29C 37/0028; B29C 37/0025
See application file for complete search history.

(56) References Cited

U.S. PATENT DOCUMENTS

| | | | |
|---|---|---|---|
| 2014/0204601 A1* | 7/2014 | Bauerle | B32B 17/10293 29/428 |
| 2021/0008964 A1* | 1/2021 | Chen | B32B 27/30 |

* cited by examiner

LIGHT-GUIDE SUNROOF ASSEMBLY

This application claims the benefit of Taiwan Patent Application Serial No. 108137743 filed Oct. 18, 2019, the subject matter of which is incorporated herein by reference.

BACKGROUND OF INVENTION

1. Field of the Invention

The present invention refers to a light-guide sunroof assembly, and more particularly to a light-guide sunroof assembly that comprises a plastic substrate made of at least two layers of plastics and a light source module furnished besides the plastic substrate; in which, an outer layer of the plastics is added with dye to form a colored background, such that the light generated by the light source module is guided by the plastic substrate and then ejects out of the inner surface of plastic substrate.

2. Description of the Prior Art

Traditional cars usually use glass to produce sunroofs, windshields, and side windows. However, because glass has the disadvantages of heavy in weight, fragile, and difficult to shape; in recent years, some people have developed plastic materials that are light-transmissive to replace traditional glass for the production of car sunroofs, windshields, and side windows. In addition, the traditional car glass sunroof has no lighting function. The roof lights are installed on the roof of car. Due to the limited space, the effective lighting area of the roof lights is limited, cannot provide enough lighting function. Furthermore, for cars with panoramic sunroofs, since there is no room for roof lights, and thereby are forced to abandon the top-down lighting function of the roof lights in the cars. In order to improve this shortcoming, some manufacturers have also developed luminous light bars around glass or plastic car sunroofs to provide a light decoration effect. In order to improve this shortcoming, some manufacturers have also developed glass or plastic car sunroofs that are surrounded by luminous light bars to provide lighting decoration effect.

Please refer to FIG. 1A and FIG. 1B, which are respectively a cross-sectional schematic diagram and a schematic top-view of an example of assembled luminous light bars around a car sunroof of conventional technology. In order to achieve the lighting decoration effect, the conventional car sunroof is attached with a luminous light bar 02 on the outer periphery of the transparent plate 01 of the sunroof made of glass or plastic. Since the conventional car sunroof transparent plate 01 has no light guide or decoration function, therefore, the light emitted by the luminous light bar 02 can only form a visual effect of a thin annular halo (light-ring) around the plate 01. In addition, the car sunroof transparent plate 01 itself does not have a light-emitting surface, not only the visual appearance is monotonous, but also it cannot provide the light decoration configuration of a surface light source.

There are various kinds of plastics, in which, engineering plastics made of polycarbonate (PC for short) have high transparency and free dyeability, high strength and coefficient of elasticity, high impact strength, wide operatible temperature range, low molding shrinkage, good dimensional stability, and good weather resistance, tasteless and odorless, harmless to the human body, in line with health and safety, easy to shape, etc., and thus is suitable to be used to make transparent plastic plates with curved surfaces or special structures, in order to replace the fragile and difficult to shape glass plates. For example, car sunroofs are usually made of polycarbonate (PC). However, polycarbonate (PC) also has the deficiencies such as poor wear resistance and easy yellowing under ultraviolet radiation and etc. . . . Therefore, in the prior arts, a wear-resistant hard layer is formed on the outer surface of the polycarbonate (PC) substrate, and an ultraviolet (UV) absorbing material is added in the substrate, in order to improve the wear-resistant ability and reduce the yellowing phenomenon of the substrate. Such method is to "absorb" the UV light. UV light will still enter the PC substrate and then be blocked. Although it has the function to blocking UV from entering the car, it will still cause UV yellowing and UV degradation of the substrate itself.

In addition, in order to have a fashionable sense of design and aesthetic visual feeling in appearance and shape, today's car sunroofs are no longer simply flat structures, but mostly plastic plates with smooth and curved surfaces. Regardless of the conventional car sunroofs which are made of either plastic or glass plates, the connecting structure (or mechanism) thereof used for connecting the car body is always made of metal and is adhered to the plastic plate (or glass plate) by using adhesive. Because the plastic plate (or glass plate) for producing the car sunroof is made of hard plate with curved surface, therefore, when the metal connecting structure (which is also a hard material) is attached on the connecting structure (or mechanism) made of metal by adhesive, it is inevitable that the joint surface between the plastic plate (or glass plate) and the connecting structure (or mechanism) will contain gaps; not only the effect of water-proofing and moisture-proofing is reduced, but also the combination strength of these two parts is worse. Furthermore, the connecting structure (or mechanism) made of metal also has the deficiencies of heavier in weight (causing the vehicle to consume more fuel and electricity during driving), fragile, lack of anti-ultraviolet (UV) and thermal insulation effects, and poor adhesion between metal and plastic (or glass) plates, and thus leaves a room for improvements.

SUMMARY OF THE INVENTION

The primary objective of the invention is to provide a light-guide sunroof assembly which comprises a plastic substrate made of at least two layers of plastics and a light source module furnished besides the plastic substrate. An outer layer of the plastics of plastic substrate is added with dye to form a colored background. A plurality of light-guide microstructures are selectively furnished at one of the plastic layers to guide the light generated by the light source module toward an inner surface of the plastic substrate. Thereby, the light generated by the light source module is guided by the plastic substrate and then ejects out of the inner surface of plastic substrate, so as to provide a light decoration or lighting effect that enriches the visual experience.

Another objective of the invention is to provide a light-guide sunroof assembly. The plastic substrate of the light-guide sunroof assembly is first formed into a curved plastic plate through a hot pressing process, and then a connecting structure is formed and fixed on the plastic plate by an insert-molding injection process, in order to replace the traditional car sunroof mechanism which is assembled by glass plate bonded with metal connecting parts. The light-guide sunroof assembly comprises a lightweight polymer sunroof and a lightweight plastic connecting structure fixed to the sunroof by insert-molding injection, which can reduce the weight of traditional glass sunroof, front and rear windshield, and side window glass assembly.

In order to achieve aforementioned objectives, the invention provides a light-guide sunroof assembly, which comprises: a substrate, at least one light source module, a primer layer, and a connecting structure. The substrate has an outer surface, an inner surface and a plurality of side surfaces vertically connected between the outer and inner surfaces. The substrate is a multilayer structure comprising at least two layers of plastic materials which comprises a transparent engineering plastic layer and a colored upper acrylic layer located above the plastic layer. Wherein, the light transmittance of the colored upper acrylic layer is less than the light transmittance of the plastic layer, in addition, the colored upper acrylic layer forms a colored background upon the plastic layer. The light source module is disposed on one of the side surfaces of the substrate. The light source module is capable of emitting light sideward toward the plastic layer, such that the light can travel laterally along the plastic layer. The primer layer is furnished at an outer rim area of the inner surface of the substrate. The connecting structure is fixed to the outer rim area of the inner surface of the substrate at a position having the primer layer. The connecting structure is capable of connecting to an external component, such that the substrate together with the at least one light source module can be connected to the external component through the connecting structure.

In an embodiment, a coloring agent is added in the upper acrylic layer, so that the upper acrylic layer has a color and its light transmittance is between 5% and 70%; the coloring agent contains at least one of the following colors: black, red, blue, green, or other relatively dark colors; the plastic layer is one of transparent, colorless or transparent-white and has a light transmittance greater than 90%.

In an embodiment, the light-guide sunroof assembly further comprises a plurality of light-guide microstructures disposed on at least one of the outer surface, or a middle layer, or the inner surface of the substrate; the plurality of light-guide microstructures can guide and direct the light traveling laterally along the plastic layer downward toward and then emit out of the inner surface of the substrate; the light-guide microstructures are arranged in a predetermined pattern; when the at least one light source module emits light, only the light at the positions of these light-guide microstructures will be guided downward and then emitted out from the inner surface of the substrate; the predetermined pattern of light emission formed by the arrangement of the light-guide microstructures can be displayed on the inner surface of the substrate.

In an embodiment, fluorescent powders are filled in the plurality of light-guide microstructures in order to improve the luminous brightness of the predetermined pattern of light emitted by the arrangement of the plurality of light-guide microstructures.

In an embodiment, the light-guide microstructures are formed by using a laser engraving machine, such that, the predetermined pattern is "engraved" inside the middle layer of the substrate.

In an embodiment, an upper hard coating layer is formed above the upper acrylic layer, and a lower hard coating layer is formed on the inner surface of the substrate. The light-guide microstructures are disposed on at least one of the following: the upper acrylic layer and the plastic layer.

In an embodiment, the substrate is composed of at least three layers of different plastic materials by coextrusion, which comprises: the plastic layer located at middle of the substrate, the upper acrylic layer located above the plastic layer, and a lower acrylic layer located under the plastic layer. An upper hard coating layer is formed above the upper acrylic layer, and a lower hard coating layer is formed under the lower acrylic layer. The lower acrylic layer is one of transparent, colorless or transparent-white, and the transmittance of the lower acrylic layer is greater than 90%. The plurality of light-guide microstructures is disposed on at least one of the following: the upper acrylic layer and the lower acrylic layer.

In an embodiment, a coated film layer is formed above the upper hard coating layer; the coated film layer comprises a cohesive layer, a UV-cut layer and a wear-resistant layer. The material of the cohesive layer comprises $SiO_2$. The material of the UV-cut layer comprises $Ti_3O_5$ added with UV absorber. The material of the wear-resistant layer comprises $SiO_2$. A top hard coating layer is further furnished on the top of the coated film layer.

In an embodiment, the light-guide sunroof assembly further comprises at least one sealing ring layer; the sealing ring layer is disposed on a surface of the primer layer facing the connecting structure, such that the sealing ring layer is sandwiched between adjoining surfaces of the primer layer and the connecting structure.

In an embodiment, the substrate has a curved surface at least at an outer peripheral region of the inner surface of the substrate. The external component is a sunroof actuating mechanism of car. The connecting structure is made of hard plastic material or metal material; wherein, when the connecting structure is made of the hard plastic material, the connecting structure is molded and fixed on the outer rim area of the inner surface of the substrate having the primer layer by using an insert-molding injection process; in addition, the hard plastic material of the connecting structure includes at least one of the following: polymethyl methacrylate (also referred as PMMA), Polycarbonate, (also referred as PC), Acrylonitrile Butadiene Styrene (also referred as ABS), Polypyromellitimide (also referred as PMMI), Polyethylene terephthalate (also referred as PET), Polyethylene 2,6-naphthalene dicarboxylate (also referred as PEN), Polyethersulfone (also referred as PES), and Polyimide (also referred as PI); when the connecting structure is made of metal material, the connecting structure is adhered and fixed to the outer rim area of the inner surface of the substrate at a position having the primer layer by using the primer layer as an adhesive. The primer layer comprises one of the following: compounds of Amines and heterocyclic amines, Silane compounds, and Polyurethane (also referred as PU), and is coated on the outer rim area of the inner surface of the substrate by precision wet coating process, and can provide good adhesion effect between the substrate and the connecting structure. The sealing ring layer comprises one or more rings which are furnished on the surface of the primer layer by a dispensing method; each ring of the sealing ring layer is extending around the outer rim area in a ring shape; the material of the sealing ring layer includes one of the following: silicone and Polyurethane (PU for short), which can improve the sealing effect between the substrate and the connecting structure.

In an embodiment, material of the substrate of the light-guide sunroof assembly is weakened at a predetermined area of the substrate, so that the substrate includes an easily breakable structure at the predetermined area.

In an embodiment, the easily breakable structure is formed by the one of the following:

a plurality of dots is densely arranged in the predetermined area of the substrate by mechanical or laser processing in order to create small cracks in the material at these densely arranged dots and makes the structure there weakened and easily broken, so as to form the easily breakable structure;

a ring-shaped dotted structure is formed in the predetermined area of the material inside the substrate by energy irradiation or a different material interface in order to make the structure of the ring-shaped dotted structure weakened and easily broken, so as to form the easily breakable structure; and a plurality of vertical dashed structures and horizontal dashed structures are formed inside the material of the substrate by energy irradiation in order to make the dashed structures weakened and easily broken, so as to form the easily breakable structure;

wherein, the easily breakable structure also has the function of directing light traveling in the substrate toward and emitting out from the inner surface of the substrate, such that a user can visually identify the location of the easily breakables structure.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The light-guide sunroof assembly of the present invention comprises a plastic substrate made of at least two layers of plastics and a light source module furnished besides the plastic substrate. An outer layer of the plastics of plastic substrate is added with dye to form a colored background. A plurality of light-guide microstructures is selectively furnished at one of the plastic layers to guide the light generated by the light source module toward an inner surface of the plastic substrate. Thereby, the light generated by the light source module is guided by the plastic substrate and ejects out of the inner surface of plastic substrate, so as to provide a light decoration or lighting effect that enriches the visual experience. Moreover, the plastic substrate is first formed into a curved plastic plate through a hot pressing process, and then a connecting structure is formed and fixed on the plastic plate by an insert-molding injection process, in order to replace the traditional car sunroof mechanism which is assembled by glass plate bonded with metal connecting parts. The light-guide sunroof assembly comprises a lightweight polymer sunroof and a lightweight plastic connecting structure fixed to the sunroof by insert-molding injection, which can reduce the weight of traditional glass sunroof, front and rear windshield, and side window glass assembly, and is particularly suitable for use in oil-electric hybrid electric vehicles and pure-electric vehicles that require lightweight specifications, and further can provide a light decoration or lighting effect.

In order to more clearly describe the structure of the light-guide sunroof assembly, detailed descriptions of various embodiments are provided with reference to the drawings.

Figure 1A:
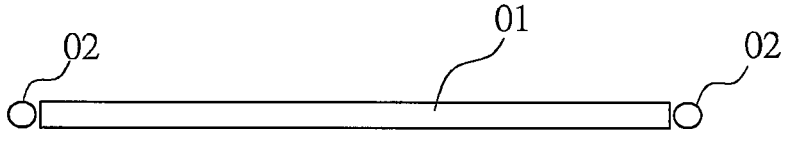
FIG. 1A and FIG. 1B are respectively a cross-sectional schematic diagram and a schematic top-view of an example of assembled luminous light bars around a car sunroof of conventional technology.
Figure 1B:
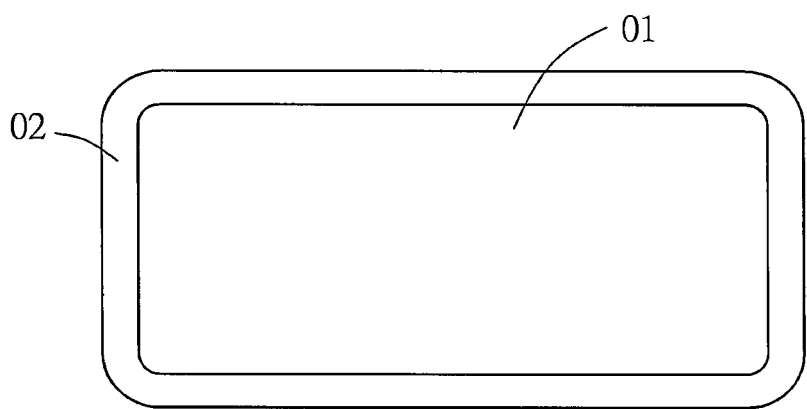
Figure 2A:
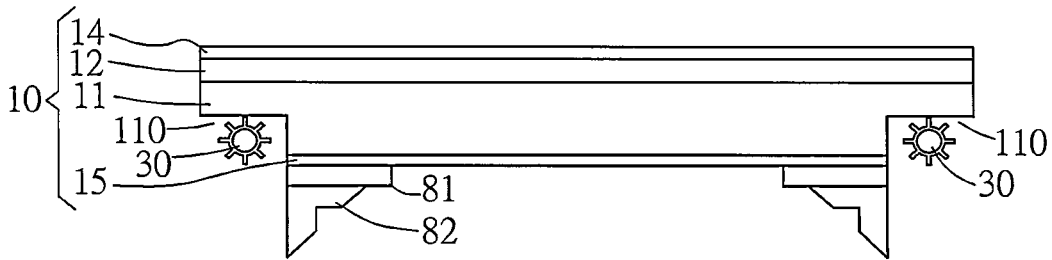
FIG. 2A and FIG. 2B are respectively the A-A cross-sectional schematic drawing and the top-view schematic drawing of the first embodiment of the light-guide sunroof assembly of the present invention.
Figure 2B:
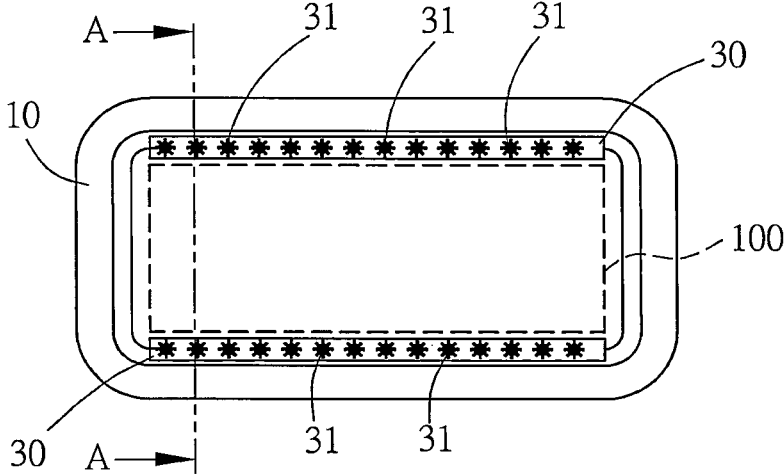

Please refer to FIG. 2A and FIG. 2B, which are respectively the A-A cross-sectional schematic drawing and the top-view schematic drawing of the first embodiment of the light-guide sunroof assembly of the present invention. In the first embodiment of the invention, the light-guide sunroof assembly comprises: a substrate 10, at least one light source module 30, a primer layer 81, and a connecting structure 82. The substrate 10 has an outer surface (upper surface), an inner surface (lower surface), and a plurality of side surfaces vertically connected between the outer and inner surfaces. In this embodiment, the substrate 10 is a multilayer structure comprising at least two layers of hard plastic materials formed by coextrusion process, which comprises: a transparent engineering plastic layer 11 made of polycarbonate (PC), and an upper acrylic layer (polymethyl methacrylate, also refers as PMMA) 12 located above the plastic layer 11. An upper hard coating layer (also referred as HC) 14 is formed above the upper acrylic layer 12, and a lower hard coating layer (HC) 15 is formed on the inner surface of substrate 10 (that is, below the lower surface of plastic layer 11). A coloring agent is added in the upper acrylic layer 12 so that the upper acrylic layer 12 has a color and its light transmittance is between 5% and 70%. Wherein, the coloring agent contains at least one of the following colors: black, red, blue, green, or other relatively dark colors. The plastic layer 11 is one of transparent, colorless or transparent-white and has a light transmittance greater than 90%. Thereby, the light transmittance of the colored upper acrylic layer 12 is less than the light transmittance of the plastic layer 11; in addition, the colored upper acrylic layer 12 can also form a colored background upon the plastic layer 11. In a more preferably embodiment, the transmittance of the upper acrylic layer 12 as a colored background is between 5% and 20%, in order to achieve a good car sunroof sun-shading function.

The at least one light source module 30 is disposed on at least one of the side surfaces of the substrate 10. The at least one light source module 30 can emit light sideward toward the plastic layer 11, such that the light can travel laterally along the plastic layer 11. In this embodiment, the at least one light source module 30 includes at least two LED light bars respectively disposed in a concave space 110 on two opposite side surfaces of the plastic layer 11, making the LED light bars to be substantially buried in the peripheral of the plastic layer 11 (i.e., buried design), such that the light source module 30 can be hidden in the mechanism design of the vehicle sunroof substrate 10. Each light bar can provide multiple point-light sources or line-light sources, which comprises a plurality of light emitting diodes 31 (LED) and a circuit component (not shown in figures) for carrying the LEDs 31. The circuit component is electrically connected to the LEDs 31 and has a connector (not shown in figures) for connecting to the vehicle's mobile computer or power supply, so as to transmit the power and control signals of the vehicle to each light bar to make it illuminate. The LEDs 31 emit light sideward toward the inside of the plastic layer 11, because the colored upper acrylic layer 12 will form a dark background on the upper surface of the plastic layer 11, therefore, the light emitted by the LEDs 31 of light source module 30 enters the plastic layer 11 and then travels laterally along the plastic layer 11, and emits out from a light-emitting area 100 of the lower surface of the plastic layer 11 (that is, the light is emitted downwardly from the inner surface of the substrate 10). Thereby, in the light-guide sunroof assembly of the present invention, the substrate 10 composed of a dark upper acrylic layer 12 and a transparent plastic layer 11 can guide the light emitted by the light source module 30 toward the inner surface of the substrate 10 in order to emit light into the vehicle, so as to achieve the visual effect of light decoration or light illumination.

In the present invention, The composition of materials of the upper and lower hard coating layers 14, 15 comprises granular dispersed nano-inorganic materials and/or organic-inorganic hybrid UV oligomers or silicone base oligomers, which can provide lightweight polymer plastic substrates with high hardness on the outer and inner surfaces and excellent Taber Test characteristics, maintain high transparency and low haze, and provide a hard and wear-resistant hard protective layer on the outer surface and the inner surface of the substrate 10. In this embodiment, the hard coating layers 14, 15 contain a UV-light elastic oligomer with high glass transition temperature (Tg≥120° C.) or a high Tg monomer (Tg≥240° C.), which can provide polymer plastic material at the adjoining surface with high impact resistance, high flexibility and good stability under high temperature, as well as to improve the reliability when proceeding with the high temperature and high humidity environmental tests. The thickness and shape of the substrate 10 may vary according to different applications; taking the car sunroof as an example, the thickness of the substrate 10 is usually between 3 mm to 12 mm. The thickness of the engineering plastic layer 11 accounts for about 60% to 99.99% of the total thickness of the substrate, while the thickness of the acrylic layer 12 accounts for about 0.01% to 40% of the total thickness of the substrate.

The composition of the hard coating layers 14, 15 of the invention comprises organic-inorganic hybrid UV oligomers. Compared with the conventional hard layer formula with high-crosslink density, the composition of the hard coating layers 14, 15 of the invention has a relatively low crosslink density, which can form a wear-resistant hard coating layer with low shrinkage and good flexibility. The inorganic material contained in the hard coating layers 14, 15 of the invention can provide good physical properties for the surfaces and thus provide the coatings with high hardness and high wear resistance. Moreover, the hard coating layers 14, 15 contain a UV-light elastic oligomer with high glass transition temperature or a high Tg monomer; compared with the conventional hard layer formula with high-crosslink density, the composition of the hard coating layers 14, 15 of the invention has better stability under high temperature. Therefore, it has better thermo-formability during high temperature processes, and the UV-cured composite sunroof material can be bended to any curvature freely.

The primer layer 81 is furnished at an outer rim area of the inner surface of the substrate 10 for improving the bonding strength and adhesion tightness between the substrate 10 and the connecting structure 82. The connecting structure 82 is fixed to the outer peripheral (rim) area of the inner surface of the substrate 10 at a position having the primer layer 81. The connecting structure 82 is for connecting to an external component located at the car roof (such like car body or sunroof actuating mechanism of car, not shown in figures), such that the substrate 10 and the light source module 30 can be connected to the external component through the connecting structure 82, and thus be fixed to the car roof.

In this embodiment, the primer layer 81 is furnished at an outer rim area of the inner surface of the substrate 10 for improving the bonding strength and adhesion tightness between the substrate 10 and the connecting structure 82. In the present invention, the primer layer 81 comprises one of the following: compounds of Amines and heterocyclic amines, Silane compounds, and Polyurethane (also referred as PU), and is coated on the outer peripheral (rim) area of the inner surface of the substrate 10 by precision wet coating process, and thus can provide good adhesion effect between heterogeneous materials and is beneficial to pass various environmental aging tests. In addition, the primer layer 81 can be mixed with a pigment (such as a black pigment) so that the primer layer 81 can also have the function of forming an ink-printed layer on the inner surface of the substrate 10.

The connecting structure 82 is fixed to the outer peripheral (rim) area of the inner surface of the substrate 10 at a position having the primer layer 81. The connecting structure 82 is for connecting to an external component (such like car body or sunroof actuating mechanism of car, not shown in figures), such that the substrate 10 together with the at least one light source 30 can be connected to the external component through the connecting structure 82. The connecting structure 82 is made of hard plastic material or metal material. In the first embodiment shown in FIG. 2A and FIG. 2B, the connecting structure 82 is made of metal such like iron, stainless steel, aluminum alloy by casting, forging or stamping processes. The connecting structure 82 is adhered and fixed to the outer peripheral (rim) area of the inner surface of the substrate 10 at a position having the primer layer 81 by using the primer layer 81 as an adhesive.

In the following embodiments of the invention, because the structures and functions of most components are the same or similar with which of the aforementioned first embodiment, thereby, the same of similar components will be given with the same names and numerals of components without repeating their detailed descriptions.

Figure 3:
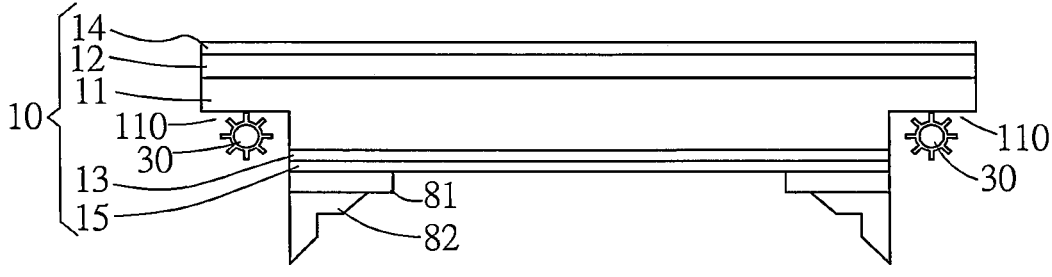
FIG. 3 is a schematic sectional view of the second embodiment of the light-guide sunroof assembly in accordance with the present invention.

Please refer to FIG. 3, which is a schematic sectional view of the second embodiment of the light-guide sunroof assembly in accordance with the present invention. In the second embodiment of the invention, the light-guide sunroof assembly also comprises: a substrate 10, at least one light source module 30, a primer layer 81 and a connecting structure 82. The difference between the light-guide sunroof assembly of the second embodiment and the aforementioned first embodiment is that, in the second embodiment of the light-guide sunroof assembly shown in FIG. 3, the substrate 10 is a multi-layer structure composed of at least three layers of different plastic materials by coextrusion, which comprises: a plastic layer 11 located at middle of the substrate 20, an upper acrylic layer (upper PMMA) 12 located above the plastic layer 11, a lower acrylic layer (lower PMMA) 13 located under the plastic layer 11, an upper hard coating layer 14 located above the upper acrylic layer 12, and a lower hard coating layer 15 located under the lower acrylic layer 13. The plastic layer 11 and the lower acrylic layer 13 are one of transparent, colorless or transparent-white, and the transmittance of both the plastic layer 11 and the lower acrylic layer 13 is greater than 90%. The upper acrylic layer 12 is internally added with black, red, blue, green, or other relatively dark coloring agents; such that the upper acrylic layer 12 can have a color, and the light transmittance of the upper acrylic layer 12 is between 5% and 70%, and thereby forming a dark background above the transparent plastic layer 11.

As for the other components of the light-guide sunroof assembly of the second embodiment, for example but not limited to: light source module 30, primer layer 81, connecting structure 82, and etc., because their structures and functions are substantially the same as or similar to those described in the first embodiment, so won't be repeatedly described here.

Figure 4:
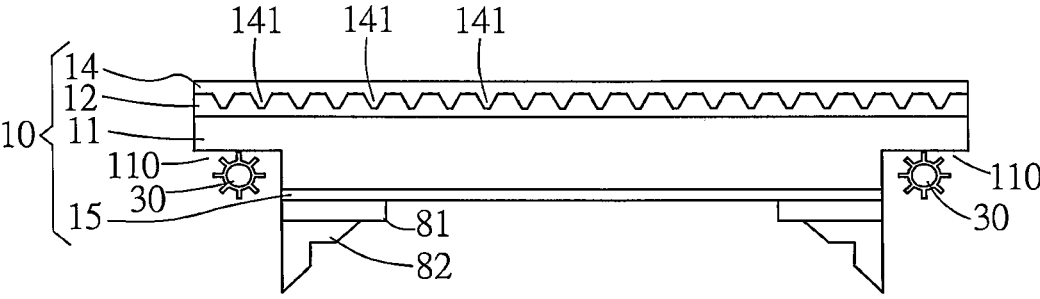
FIG. 4 is a schematic cross-sectional view of a third embodiment of the light-guide sunroof assembly of the present invention.

Please refer to FIG. 4, which is a schematic cross-sectional view of a third embodiment of the light-guide sunroof assembly of the present invention. In the third embodiment of the present invention, the light-guide sunroof assembly also comprises: a substrate 10, at least one light source module 30, a primer layer 81 and a connecting structure 82. The substrate 10 is a multilayer structure comprising at least two layers of different plastic materials, which comprises: a transparent engineering plastic layer 11 made of polycarbonate (PC), and an upper acrylic layer (PMMA) 12 located above the plastic layer 11. The plastic layer 11 is one of transparent, colorless or transparent-white and has a light transmittance greater than 90%. A coloring agent such as black, red, blue, green, or other relatively dark color is added in the upper acrylic layer 12 so that the upper acrylic layer 12 has a color and its light transmittance is between 5% and 20%. The colored upper acrylic layer 12 forms a colored background upon the plastic layer 11. An upper hard coating layer (HC) 14 is formed above the upper acrylic layer 12, and a lower hard coating layer (HC) 15 is formed on the inner surface of substrate 10 (that is, below the lower surface of plastic layer 11). The difference between the light-guide sunroof assembly of the third embodiment and the aforementioned first embodiment is that, in the third embodiment of the light-guide sunroof assembly shown in FIG. 4, the light-guide sunroof assembly further comprises a plurality of light-guide microstructures 141 disposed on at least one of the outer surface or the inner surface of the substrate 10. As shown in FIG. 4, the plurality of light-guide microstructures 141 are arranged on the upper surface of the upper acrylic layer 12, or the lower surface of the upper hard coating layer 14, or a middle layer between the upper acrylic layer 12 and the upper hard coating layer 14. The plurality of light-guide microstructures 141 can guide and direct the light traveling along the horizontal direction of the engineering plastic layer 11 downward toward and then emit out of the inner surface of the substrate 10. These light-guide microstructures 141 are arranged in a predetermined pattern; therefore, when the at least one light source module 30 emits light, only the light at the positions of these light-guide microstructures 141 will be guided downward and then emitted from the inner surface of the substrate 10, and the predetermined pattern of light emission formed by the arrangement of these light-guide microstructures 141 can be displayed on the inner surface of the substrate 10, so as to achieve the visual effect of light decoration.

Figure 5A:
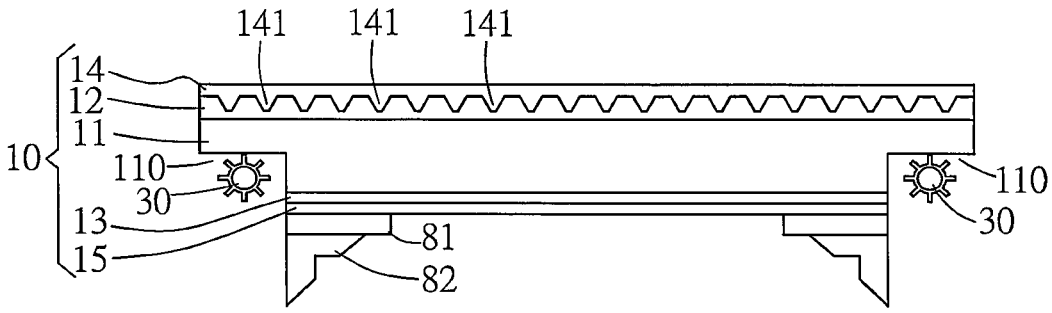
FIG. 5A and FIG. 5B are respectively a schematic cross-sectional view and a schematic top view of the fourth embodiment of the light-guide sunroof assembly of the present invention.
Figure 5B:
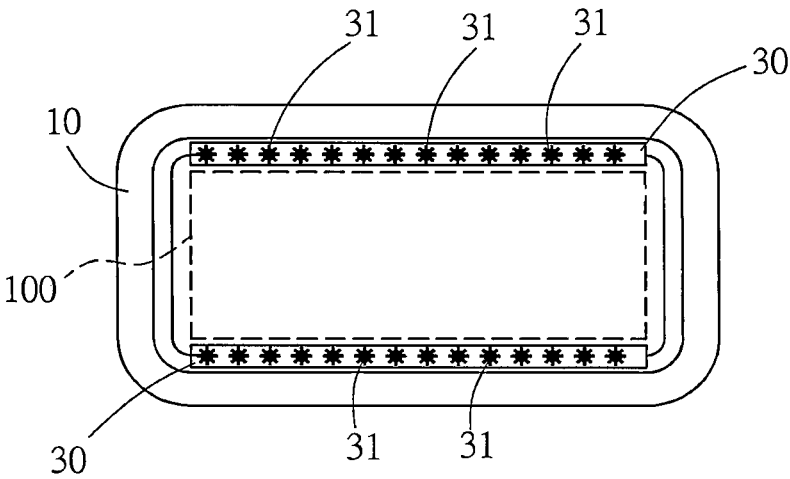

Please refer to FIG. 5A and FIG. 5B, which are respectively a schematic cross-sectional view and a schematic top view of the fourth embodiment of the light-guide sunroof assembly of the present invention. In the fourth embodiment of the present invention, the light-guide sunroof assembly also comprises: a substrate 10, at least one light source module 30, a primer layer 81 and a connecting structure 82. The substrate 10 is a multilayer structure comprising at least three layers of different plastic materials, which comprises: a transparent engineering plastic layer 11 made of polycarbonate (PC), an upper acrylic layer (PMMA) 12 located above the plastic layer 11, and a lower acrylic layer (PMMA) 13 located below the plastic layer 11. The plastic layer 11 and the lower acrylic layer 13 both are either transparent, colorless or transparent-white and have a light transmittance greater than 90%. A coloring agent such as black, red, blue, green, or other relatively dark color is added in the upper acrylic layer 12 so that the upper acrylic layer 12 has a color and its light transmittance is between 5% and 20%, such that, the colored upper acrylic layer 12 forms a colored background upon the plastic layer 11. An upper hard coating layer (HC) 14 is formed above the upper acrylic layer 12, and a lower hard coating layer (HC) 15 is formed below the lower acrylic layer 13. The difference between the light-guide sunroof assembly of the fourth embodiment and the aforementioned first embodiment is that, in the fourth embodiment of the light-guide sunroof assembly shown in FIG. 5A and FIG. 5B, the light-guide sunroof assembly further comprises a plurality of light-guide microstructures 141 disposed on at least one of the following: the upper surface of the upper acrylic layer 12, the lower surface of the upper hard coating layer 14, or between the upper acrylic layer 12 and the upper hard coating layer 14. The plurality of light-guide microstructures 141 can guide and direct the light traveling along the horizontal direction of the engineering plastic layer 11 downward toward and then emit out of the inner surface of the substrate 10. These light-guide microstructures 141 are arranged in a predetermined pattern; therefore, when the at least one light source module 30 emits light, only the light at the positions of these light-guide microstructures 141 will be guided downward and then emitted from the inner surface of the substrate 10, and the predetermined pattern of light emission formed by the arrangement of these light-guide microstructures 141 can be displayed in a light-emitting area 100 on the inner surface of the substrate 10, so as to achieve the visual effect of light decoration.

Figure 6:
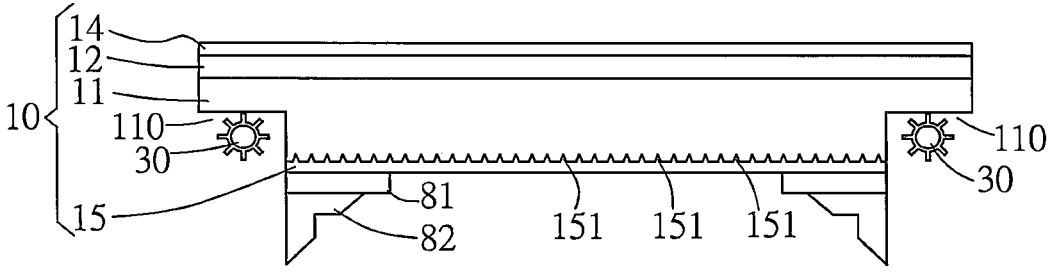
FIG. 6 is a schematic cross-sectional view of a fifth embodiment of the light-guide sunroof assembly of the present invention.

Please refer to FIG. 6, which is a schematic cross-sectional view of a fifth embodiment of the light-guide sunroof assembly of the present invention. In the fifth embodiment of the present invention, the light-guide sun-roof assembly also comprises: a substrate 10, at least one light source module 30, a primer layer 81 and a connecting structure 82. The substrate 10 is a multilayer structure comprising at least two layers of different materials, which comprises: a transparent engineering plastic layer 11, and an upper acrylic layer 12 located above the plastic layer 11. The plastic layer 11 is one of transparent, colorless or transpar-ent-white and has a light transmittance greater than 90%. A coloring agent such as black, red, blue, green, or other relatively dark color is added in the upper acrylic layer 12 so that the upper acrylic layer 12 has a color and its light transmittance is between 5% and 20%. The colored upper acrylic layer 12 forms a colored background upon the plastic layer 11. An upper hard coating layer 14 is formed above the upper acrylic layer 12, and a lower hard coating layer 15 is formed on the inner surface of substrate 10. The difference between the light-guide sunroof assembly of the fifth embodiment and the aforementioned first embodiment is that, in the fifth embodiment of the light-guide sunroof assembly shown in FIG. 6, the light-guide sunroof assembly further comprises a plurality of light-guide microstructures 151 disposed on at least one of the lower surface of the plastic layer 11, or the upper surface of the lower hard coating layer 15, or between the lower surface of the plastic layer 11 and the lower hard coating layer 15. The plurality of light-guide microstructures 151 can guide and direct the light traveling along the horizontal direction of the plastic layer 11 downward toward and then emit out of the inner surface of the substrate 10, so as to achieve the visual effect of light decoration.

Figure 7:
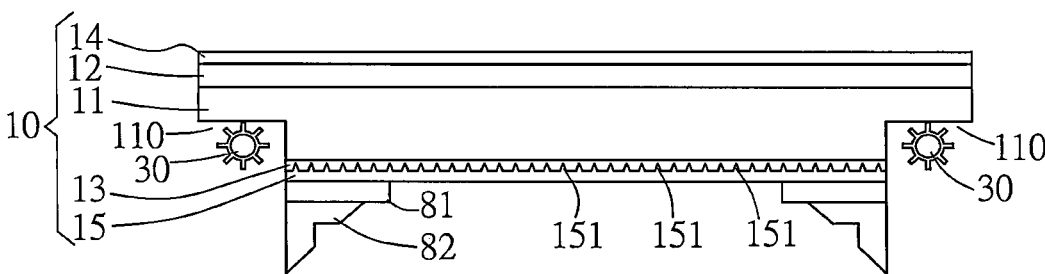
FIG. 7 is a schematic cross-sectional view of a sixth embodiment of the light-guide sunroof assembly of the present invention.

Please refer to FIG. 7, which is a schematic cross-sectional view of a sixth embodiment of the light-guide sunroof assembly of the present invention. In the sixth embodiment of the present invention, the light-guide sun-roof assembly also comprises: a substrate 10, at least one light source module 30, a primer layer 81 and a connecting structure 82. The substrate 10 is a multilayer structure comprising at least three layers of different materials, which comprises: a transparent engineering plastic layer 11, an upper acrylic layer 12 located above the plastic layer 11, and a lower acrylic layer 13 located below the plastic layer 11. The plastic layer 11 and the lower acrylic layer 13 are both transparent, colorless or transparent-white and have light transmittance greater than 90%. A coloring agent such as black, red, blue, green, or other relatively dark color is added in the upper acrylic layer 12 so that the upper acrylic layer 12 has a color and its light transmittance is between 5% and 20%. The colored upper acrylic layer 12 forms a colored background upon the plastic layer 11. An upper hard coating layer 14 is formed above the upper acrylic layer 12, and a lower hard coating layer 15 is formed below the lower acrylic layer 13. In the sixth embodiment of the light-guide sunroof assembly shown in FIG. 7, the light-guide sunroof assembly further comprises a plurality of light-guide micro-structures 151 disposed on at least one of the lower surface of the lower acrylic layer 13, or the upper surface of the lower hard coating layer 15, or between the lower acrylic layer 13 and the lower hard coating layer 15. The plurality of light-guide microstructures 151 can guide and direct the light traveling along the horizontal direction of the plastic layer 11 downward toward and then emit out of the inner surface of the substrate 10, so as to achieve the visual effect of light decoration.

In a preferred embodiment of the invention, fluorescent powders can be filled in the recesses of the plurality of light-guide microstructures 141, 151, in order to improve the luminous brightness of the predetermined pattern of light emitted by the arrangement of the plurality of light-guide microstructures 141, 151.

In this invention, the plurality of light-guide microstruc-tures 141 and 151 are formed on the surface of the substrate by using physical processing methods and tools such as laser carving machines, laser engraving machines or computer numerical controlled (CNC) milling or other processing machines. The locations of the light-guide microstructures 141 and 151 can be formed on the surface of the plastic layer, the upper or lower acrylic layer, or the upper or lower hard coating layer. When the light-guide microstructures are fabricated on the surface of a polymer material (for example, the engineering plastic layer or one of the upper and lower acrylic layers), the thickness of the subsequent hard layers must not be larger than the depth of the light-guide micro-structures. If the light-guide microstructures are fabricated on the surface of the hard coating layer, it is necessary to consider that the depth of the post-processed light-guide microstructures should not be deeper than the thickness of the hard coating layer. The detailed and specific shape or structure of the light-guide microstructures itself is not described in detail because it can be selected from the well-known technologies.

Figures 8, 9:
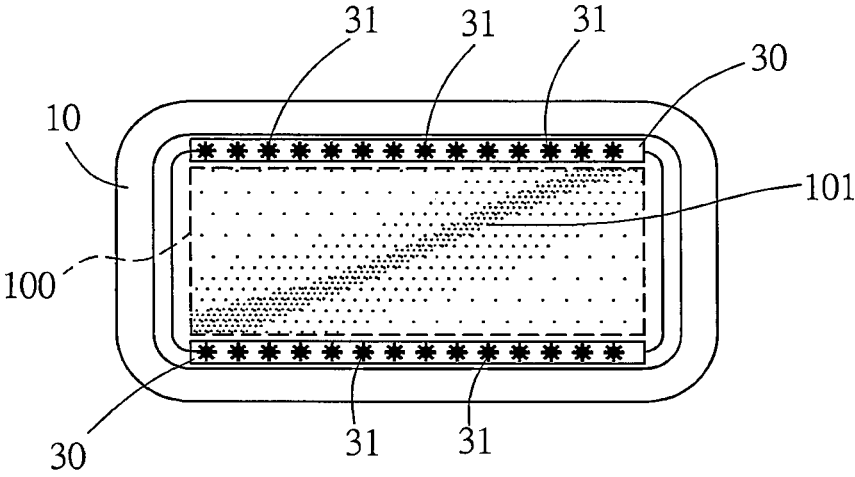
FIG. 8 is a schematic diagram of an embodiment of the predetermined pattern of light emission formed by the arrangement of the plurality of light-guide microstructures of the light-guide sunroof assembly of the present invention.
FIG. 9 is a schematic diagram of another embodiment of the predetermined pattern of light emission formed by the arrangement of the plurality of light-guide microstructures of the light-guide sunroof assembly of the present invention.

Please refer to FIG. 8, which is a schematic diagram of an embodiment of the predetermined pattern of light emission formed by the arrangement of the plurality of light-guide microstructures of the light-guide sunroof assembly of the present invention. In this embodiment, the predetermined pattern formed by the arrangement of the plurality of light-guide microstructures looks like a night sky pattern having starlight and galaxy. That is, when the light source module 30 emits light, the light guiding effect of each light-guide microstructure will form a light spot 101 similar to the light of a star under the inner surface of the substrate; therefore, the starry light spots 101 provided by a lot of light-guide microstructures can provide a visual experience of light decoration similar to the numerous stars and the galaxy in the night sky.

Please refer to FIG. 9, which is a schematic diagram of another embodiment of the predetermined pattern of light emission formed by the arrangement of the plurality of light-guide microstructures of the light-guide sunroof assembly of the present invention. In this embodiment, the predetermined pattern formed by the arrangement of the plurality of light-guide microstructures presents specific patterns or texts. When the light source module 30 emits light, the light guiding effect of the light-guide microstruc-tures will form specific patterns or texts arranged by the plurality of light spots 101 under the inner surface of the substrate, and such patterns or texts can be designed by the customer or the car factory to provide honorable and unique light decoration visual experience.

In a further embodiment, the predetermined pattern formed by the arrangement of the plurality of light-guide microstructures can also be a very dense and regularly arranged array pattern; such that, the light emitted by the light source module 30 can be emitted neatly and in large quantities from the inner surface of the substrate, in order to provide lighting effects similar to car roof lights.

In yet another embodiment, according to the predetermined patterns of light emissions formed by the arrangements of the plurality of light-guide microstructures as shown in FIG. 8 and FIG. 9, the light-guide microstructures are formed by using two-dimensional (2D) or three-dimensional (3D) laser engraving machines. By using the 2D or 3D laser engraving machine, the predetermined pattern is "Engraved" as a plane pattern or a 3D pattern inside the middle layer of the substrate 10, but not formed on the upper or lower surface of the substrate 10. Similarly, the light traveling along the horizontal direction of the engineering plastic layer can also be directed toward the bottom of the substrate 10 at locations of the light-guide microstructure formed by the laser engraving machine, therefore, the plurality of light spots 101 provided by the light-guide microstructures can provide a visual experience of light decoration similar to specific patterns, or texts, or numerous stars.

Figures 10, 11:
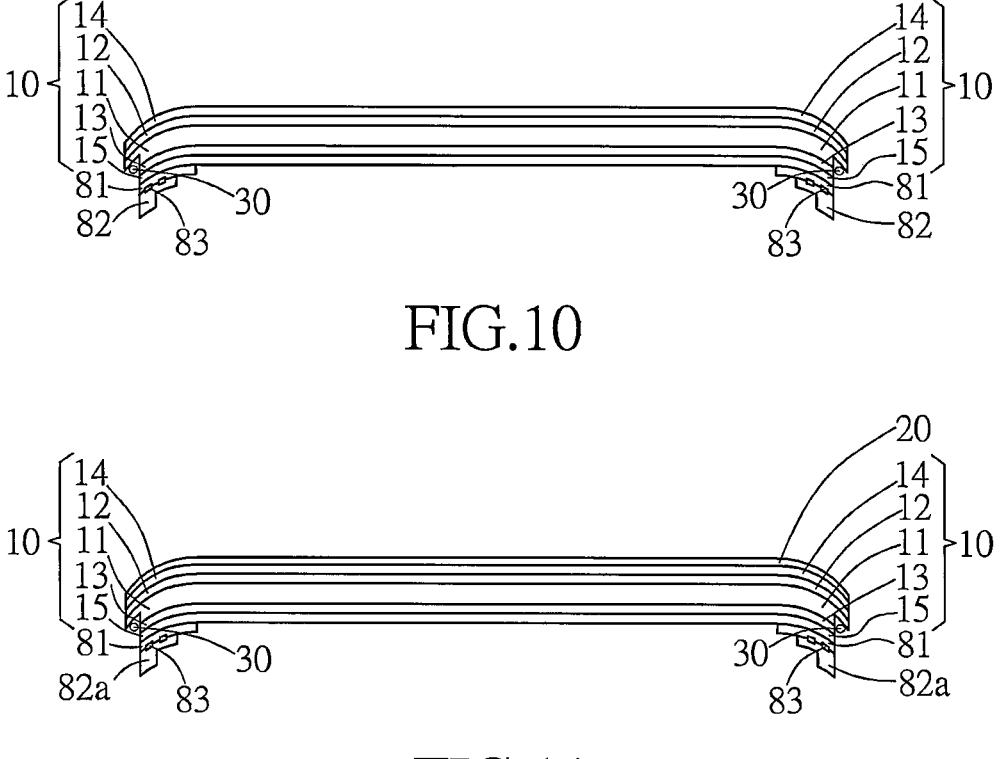
FIG. 10 is a schematic sectional view of the seventh embodiment of the light-guide sunroof assembly in accordance with the present invention.
FIG. 11 is a schematic sectional view of the eighth embodiment of the light-guide sunroof assembly in accordance with the present invention.

Please refer to FIG. 10, which is a schematic sectional view of the seventh embodiment of the light-guide sunroof assembly in accordance with the present invention. In the seventh embodiment of the invention, the substrate of the light-guide sunroof assembly is a light-transmissive plastic plate structure with curved surface. The seventh embodiment of the light-guide sunroof assembly has a structure similar with which of the first embodiment and also comprises: a substrate 10 formed with a concave space 110, at least one light source module 30 located at the concave space 110, a primer layer 81 and a connecting structure 82. In addition, the substrate 10 also comprises: a plastic layer 11, an upper acrylic layer (upper PMMA) 12, a lower acrylic layer (lower PMMA) 13, an upper hard coating layer 14 and a lower hard coating layer 15. Because the substrate 10 of the invention is made of hard material with curved surface, and the connecting structure 82 is also made of hard metal; when the curvatures of the joining surfaces of these two components mismatch (curvature tolerance exists), the sealing effect and tightness become poor, and the problem of leaks arises. Therefore, in the seventh embodiment of the invention shown in FIG. 10, one or more rings of high-temperature-resistant sealing ring layer 83 are partially furnished on the primer layer 81 by dispensing method, which can effectively fill the gaps between two hard materials, and avoid leakage risk of composite sunroof assembly due to curvature tolerance (curvature mismatch). In this embodiment, the sealing ring layer 83 is disposed on a surface of the primer layer 81 facing the connecting structure 82, such that the sealing ring layer 83 is sandwiched between the adjoining surfaces of the primer layer 81 and the connecting structure 82. The one or more rings of sealing ring layer 83 are applied on the surface of the primer layer 81 facing the connecting structure 82 by a dispensing method, and each ring of the sealing ring layer 83 is extending around the outer peripheral (rim) area in a ring shape. The material of the sealing ring layer 83 includes one of the following: silicone and Polyurethane (PU for short), which can fill the gaps caused by curvature tolerance between hard materials in order to improve the sealing effect between the substrate 10 and the connecting structure 82 and is beneficial to pass the leak test.

It is worth mentioning that, in the seventh embodiment of the light-guide sunroof assembly of the present invention shown in FIG. 10, the plastic layer 11 or one of the upper and lower acrylic layers 12, 13 is also provided with the light-guide microstructures for guiding light to the lower surface of the substrate 10; these light-guide microstructures are not drawn/shown in FIG. 10 just to make the drawing of FIG. 10 concise.

In addition to the aforementioned connecting structure that is made of metal, the invention further provides a technology for directly molding and fixing the connecting structure onto the plastic plate by using an insert-molding injection process, which can replace the traditional car sunroof mechanism which is assembled by glass plate bonded with metal connecting parts.

Please refer to FIG. 11, which is a schematic sectional view of the eighth embodiment of the light-guide sunroof assembly in accordance with the present invention. In the eighth embodiment of the invention, the light-guide sunroof assembly is similar to the aforementioned seventh embodiment and also comprises: a substrate 10 formed with a concave space 110, a light source module 30 located at the concave space 110, a primer layer 81, a connecting structure 82 and at least one sealing ring layer 83. In addition, the substrate 10 also comprises: a plastic layer 11, upper and lower acrylic layers 12, 13, and upper and lower hard coating layers 14, 15. The differences between the eighth embodiment and previously illustrated embodiments comprise: the connecting structure 82a is made of a hard plastic material and is molded and fixed on the outer peripheral (rim) area of the inner surface of the substrate 10 having the primer layer 81 by using an insert-molding injection process; wherein the thickness of the connecting structure 82a is between 1 mm to 50 mm. In addition, the hard plastic material of the connecting structure 82a includes at least one of the following: polymethyl methacrylate (also referred as PMMA), Polycarbonate, (also referred as PC), Acrylonitrile Butadiene Styrene (also referred as ABS), Polypyromellit-imide (also referred as PMMI), Polyethylene terephthalate (also referred as PET), Polyethylene 2,6-naphthalene dicarboxylate (also referred as PEN), Polyethersulfone (also referred as PES), and Polyimide (also referred as PI). Moreover, in the eighth embodiment shown in FIG. 11, a coated film layer 20 having a multilayer film structure is further provided on at least the upper hard coating layer 14 of the substrate 10. The coated film layer 20 can provide anti-ultraviolet and abrasion resistance effects to the surface of the substrate 10, and also can improve the shortcomings of the substrate 10 itself, such as poor surface hardness and abrasion resistance, as well as yellowing or degradation due to long-term exposure to heat or ultraviolet. The details of the coated film layer 20 will be described in detail in the subsequent embodiments. It is worth mentioning that, in the eighth embodiment of the light-guide sunroof assembly of the present invention shown in FIG. 11, the plastic layer 11 or one of the upper and lower acrylic layers 12, 13 is also provided with the light-guide microstructures for guiding light to the lower surface of the substrate 10; these light-guide microstructures are not drawn/shown in FIG. 11 just to make the drawing of FIG. 11 concise.

The light-guide sunroof assembly having a substrate with curved surface of the invention provides a solution for lightweight polymer sunroof of cars, which comprises a lightweight polymer sunroof and a lightweight plastic connecting structure fixed to the sunroof by insert-molding injection, and thus can reduce the weight of traditional glass sunroof assembled by glass and metal, and is particularly suitable for use in oil-electric hybrid vehicles and pure-electric vehicles that require lightweight specifications. The lightweight polymer sunroof of the invention comprises primer layer and sealing ring layer sandwiched between the plastic substrate and the plastic connecting structure, especially suitable to be manufactured by using insert-molding injection process to assemble two or more hard and different plastic materials, and has the following advantages:

1. Can reduce the weight of traditional glass sunroof, front and rear windshield, and side window glass assembly, and also has the advantages of light weight (reducing fuel consumption or power consumption) and safety (uneasy to break). The invention uses composite materials such like PMMA/PC/PMMA or PMMA/PC to make the substrate, and uses wet coating and sputtering coating processes to produce the sunroof, the surface hardness can be increased to more than 4 H (4 H~9 H), the wear resistance can pass the Taber Test with level "L", and the UV yellowing resistance test (5000 hours) can maintain the specification of $\Delta E<1$. The manufacturing method of the mechanism of the connecting structure of the present invention is to directly place the composite sunroof into the injection machine, and then using the insert-molding injection process to insert-mold the connecting structure onto the sunroof. Not only the weight can be reduced by replacing the glass with the polymer PC substrate, but also the weight can be further reduced by replacing the iron or stainless steel parts with the polymer connecting structure, and that the effect of reducing the overall weight to ½ to ⅓ of the original weight of the conventional sunroof made of glass and metal parts can be achieved.

2. By using the polymer material formula, coating formula design and precision coating technologies, the abrasion resistance of polymer surfaces can be improved to the same level as glass (abrasion resistance test "Taber Test" can reach "L" level), and the original optical and physical properties can also be maintained after passing various weather resistance tests. The traditional insert-molded polymer materials (connecting structure) and the injection adjoining surface (hard coating of the substrate) cannot be effectively bonded because of their different material properties, and might peel off after environmental tests. In the present invention, a high-temperature-resistant primer layer made of Amine, Silane, or PU-based material is used as the bonding medium between the hard coating layer of substrate and the injected connecting structure, such that, the hard coating layer adjoining the injection surface can has a high surface dyne value (>44 dyne), which is conducive to the bonding of the injected connecting structure; not only can pass the harsh high temperature, high temperature and high humidity, high and low temperatures with cold and hot shock environmental tests, but also can avoid the problems of peeling of the injected polymer connecting structure from the composite sunroof after the environmental tests.

3. By the manufacturing process that the plastic plate is first hot pressed and then insert-molding injected, the conventional design of glass bonded with metal parts can be replaced. In the traditional injection process, the insert-molding polymer materials must reach a high temperature of more than 250 Celsius degrees in the injection screw, and be injected on the hard coating layer of the bonding surface of the composite sunroof; thereby, the composite sunroof has to suffer the high temperature of the injection process. In addition, because the composite sunroof substrate is a hard plastic material with a curved surface, and the injected polymer connecting structure is also made of hard plastic, when the curvatures of the adjoining surfaces of these two parts do not match (curvature tolerance), it will cause poor sealing between these two parts and thus result in water leakage problems. According to the present invention, one or more rings of high-temperature-resistant sealing ring layer are partially furnished on the primer layer 81 by dispensing method, which can be performed coordinating with the injection process, and can effectively fill the gaps between two hard materials, so as to avoid the risk of leakage of composite sunroof assembly due to curvature tolerance (curvature mismatch)

Figure 12A:
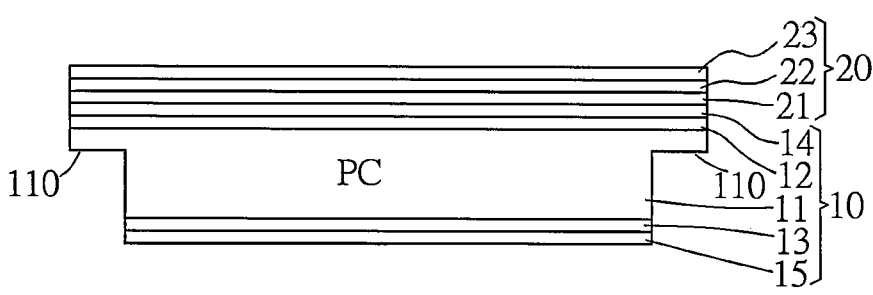
FIG. 12A is a schematic drawing of the first embodiment of the coated film layer furnished on the substrate of the invention.

Please refer to FIG. 12A, which is a schematic drawing of the first embodiment of the coated film layer furnished on the substrate of the invention. The substrate 10 shown in FIG. 12A is similar to the eighth embodiment shown in FIG. 11 and also comprises: a plastic layer 11, upper and lower acrylic layers 12, 13, upper and lower hard coating layers 14, 15, and a coated film layer 20 located above the upper hard coating layer 14. In the present invention, the coated film layer 20 comprises multifunctional optical inorganic materials, which can provide effects of UV resistance, IR resistance and surface abrasion resistance, and can pass L-level Taber Test. Wherein, the multifunctional optical inorganic materials comprise: $SiO_2$, $Ti_3O_5$, $Nb_2O_5$ and/or other materials with low refractive index or high refractive index. As shown in FIG. 12A, the first embodiment of the coated film layer 20 comprises (from bottom to up): a cohesive layer 21, a UV-cut layer 22 and a wear-resistant layer 23. In this embodiment, the multilayer film structure of the coated film layer 20 can be sequentially formed by a plasma enhanced chemical vapor deposition (also referred as Plasma-Enhanced CVD or PECVD) or vacuum sputtering process on the outer surface of the substrate 10 (that is, the outer surface of the upper hard coating layer 14). In this embodiment, the material of the cohesive layer 21 can be $SiO_2$, the material of the UV-cut layer 22 can be $Ti_3O_5$ added with UV absorber, while the material of the wear-resistant layer 23 can include $SiO_2$.

In a preferred embodiment, the different materials of different layers of the substrate have different glass transition temperatures (Tg), and the differences between these different glass transition temperatures of different materials are ranged in 30-60. In addition, a ratio of thicknesses of these different layers of the substrate is between 0.0001~0.001. The refractive index difference between the wear-resistant layer and the UV-cut layer is at least 0.3. For light in ultraviolet wavelength range, the ratio of the refractive indices of the wear-resistant layer and the UV-cut layer is between 2.35 and 1.38. The thickness difference between the wear-resistant layer and the UV-cut layer is at least 100 nm.

Figure 12B:
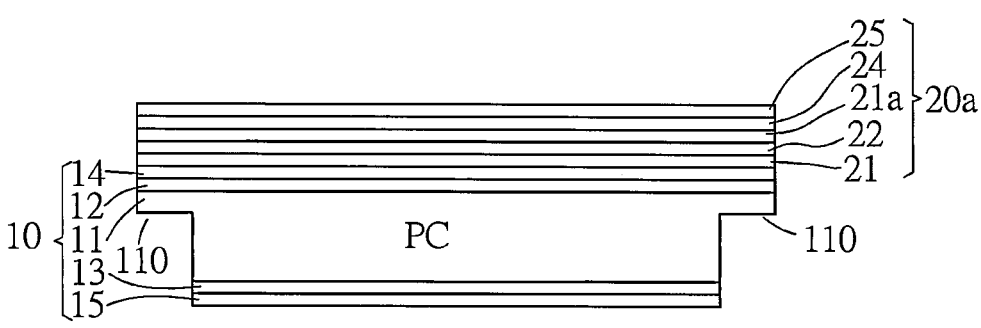
FIG. 12B is a schematic drawing of the second embodiment of the coated film layer furnished on the substrate of the invention.

Please refer to FIG. 12B, which is a schematic drawing of the second embodiment of the coated film layer furnished on the substrate of the invention. In FIG. 12B, the second embodiment of the coated film layer 20a comprises (from bottom to top sequentially): a first cohesive layer 21, a UV-cut layer 22, a second cohesive layer 21a, an IR-cut layer 24 and a wear-resistant layer 25. The material of first and second cohesive layers 21, 21a can include $SiO_2$, the materials of the UV-cut layer 22 and the IR-cut layer 24 can be $Ti_3O_5$ added with UV absorber and IR absorber respectively, while the material of the wear-resistant layer 25 can include $SiO_2$. By providing the anti-ultraviolet (UV-cut) and anti-infrared (IR-cut) functions on the outer surface of the substrate 10 body, not only the UV and IR blocking effects can be provided, but also the substrate itself does not yellow, and it does not accumulate thermal energy as well; the substrate itself retains optically transparent status.

Figure 12C:
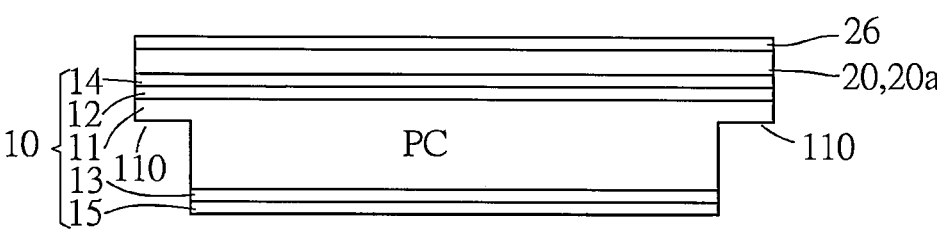
FIG. 12C is a schematic drawing of the third embodiment of the coated film layer furnished on the substrate of the invention.

Please refer to FIG. 12C, which is a schematic drawing of the third embodiment of the coated film layer furnished on the substrate of the invention. In FIG. 12C, the structure of the coated film layer 20, 20*a* can be the same as the embodiment illustrated in FIG. 12A or FIG. 12B, however, a top hard coating layer 26 can be further furnished on the top of the coated film layer 20, 20*a* in order to improve the hardness and abrasion resistance ability of the top surface of the coated film layer 20, 20*a*; in addition, the top surface of the coated film layer 20, 20*a* is better resistant to strong acid and alkali.

Figures 13A, 13B, 13C:
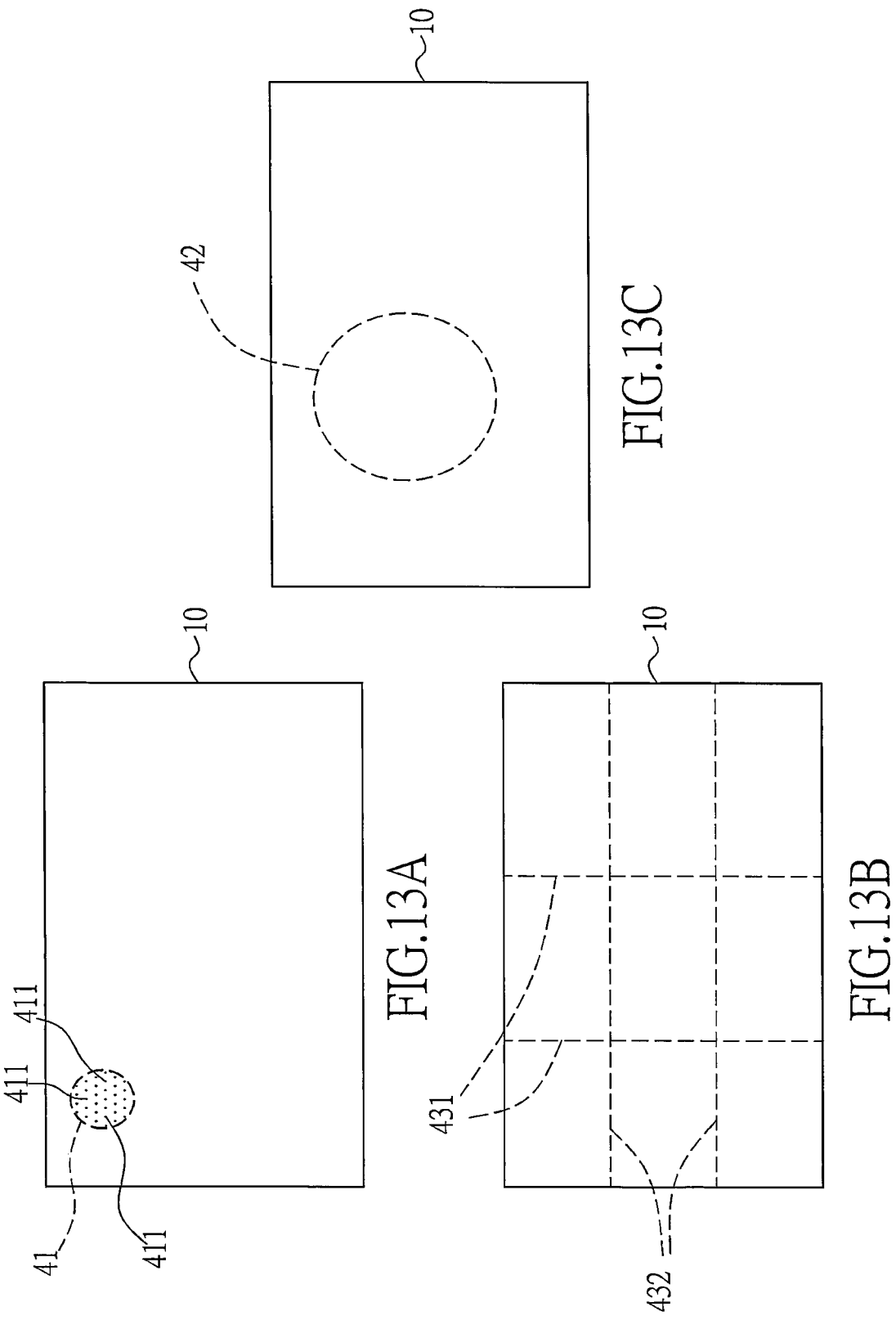
FIG. 13A, FIG. 13B and FIG. 13C respectively are the schematic diagrams of three embodiments of the easily breakable structure provided on the substrate of the present invention.

Please refer to FIG. 13A, FIG. 13B and FIG. 13C, which respectively are the schematic diagrams of three embodiments of the easily breakable structure provided on the substrate of the present invention. In this invention, the material of the substrate 10 of the light-guide sunroof assembly can be weakened by mechanical or laser methods at a predetermined area (usually near to a corner) of the substrate 10, so that the substrate 10 will include a predetermined area with an easily breakable structure after the weakening treatment. When an emergency occurs, the user can operate a tool (such as a hammer) to aim at the predetermined area of the easily breakable structure to strike, and the substrate 10 will be easily broken from this predetermined area, such that, it will be convenient for users to escape through the broken substrate 10 (that is, sunroof of vehicle). As shown in FIG. 13A, the dots 411 are densely arranged in a partial area 41 (i.e., the predetermined area) of the substrate 10 by mechanical or laser processing in order to create small cracks in the material at these densely arranged dots 411 and makes the structure there weakened and easily broken, so as to form the easily breakable structure. As shown in FIG. 13B, a ring-shaped dotted structure 42 is formed in a predetermined part (i.e., the predetermined area) of the material inside the substrate 10 by energy irradiation (for example, high-energy laser irradiation) or a different material interface in order to make the structure of the ring-shaped dotted structure 42 weakened and easily broken, so as to form the easily breakable structure. As shown in FIG. 13C, a plurality of vertical dashed structures 431 and horizontal dashed structures 432 are formed inside the material of the substrate 10 by energy irradiation in order to make the structure at the dashed structures 431 and 432 weakened and easily broken, so as to form the easily breakable structure. Preferably, the easily breakable structure also has the function of directing light traveling in the horizontal direction inside the substrate 10 toward the inner surface of the substrate 10 and allowing the directed light to emit out from the inner surface of the substrate 10, such that the user can visually identify the location of the easily breakables structure.

An embodiment of the manufacturing method of the light-guide assembly according to the present invention comprises the following steps.

Step A: providing a substrate. The substrate at least comprises a plastic material with multilayer structure. In this embodiment, the substrate can be the substrate with coated film layer shown in FIG. 11, in which, the detailed and specific structure of the substrate and the coated film layer can be selected from any of the substrates and the coated film layers shown in FIG. 11 and FIGS. 12A to 12C.

Step B: preheating the substrate. The substrate is heated to a first predetermined temperature by a preheating process.

Step C: cooling and pressure-molding the substrate with mold. By using a stamping process and a cooling process, the substrate is first cooled down to a second predetermined temperature, and then the substrate is pressure-molded by a mold at the same time.

Step D: cutting the contour of substrate by CNC. The contour of the pressure-molded substrate is cut by a CNC (Computer Numerical Control) milling machine to make a plastic plate with a predetermined contour and shape.

Step E: applying primer layer. By using a coating process, a primer layer is applied to an outer peripheral (rim) area of the surface of the plastic plate.

Step F: applying sealing ring layer. By using a glue dispensing process, at least one sealing ring layer is provided on the primer layer. The sealing ring layer is partially disposed on the surface of the primer layer facing the connecting structure, and the sealing ring layer is sandwiched between the contact surfaces of the primer layer and the connecting structure.

Step G: insert-molding injection of the connecting structure. Through an insert-molding injection process, a connecting structure is formed in an insert-molding injection manner and fixed at the position of the outer peripheral (rim) area of the plastic plate having the primer layer.

Step H: assembling at least one light source module in a concave space installed on the side surface of the plastic layer of the substrate. The light-guide sunroof assembly as shown in FIG. 11 can be manufactured through the above Steps A-H.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A manufacturing method of light-guide sunroof assembly, comprising steps of:

providing a substrate; the substrate having an outer surface, an inner surface and a plurality of side surfaces vertically connected between the outer and inner surfaces; the substrate being a multilayer structure integrally formed by coextrusion; the substrate comprising a transparent engineering plastic layer, a colored upper acrylic layer located above the plastic layer, a lower acrylic layer located below the plastic layer, an upper hard coating layer located above the upper acrylic layer, and a lower hard coating layer located below the lower acrylic layer; wherein an exposed surface of the lower hard coating layer is the inner surface of the substrate; wherein, the light transmittance of the colored upper acrylic layer is less than the light transmittance of the plastic layer, in addition, the colored upper acrylic layer forms a colored background upon the plastic layer; wherein the plastic layer is in direct contact with the upper acrylic layer and the lower acrylic layer respectively;

preheating the substrate; the substrate being heated to a first predetermined temperature by a preheating process;

cooling and pressure-molding the substrate; by using a stamping process and a cooling process, the substrate being first cooled down to a second predetermined temperature, and then the substrate being pressure-molded by a mold; wherein the substrate has a curved surface at least at an outer rim area of the inner surface;

cutting a contour of the substrate; after the cooling and pressure-molding step, the contour of the pressure-molded substrate being cut by a CNC (Computer Numerical Control) milling machine to make the substrate with a predetermined contour and shape;

applying a primer layer; after the cutting step, by using a coating process, a primer layer being applied at the curved surface of the outer rim area of the inner surface of the substrate in such a manner that the primer layer is in direct contact with the curved surface of the outer rim area of the inner surface of the substrate;

applying a sealing ring layer; after the step of applying the primer layer, by using a glue dispensing process, two sealing rings being disposed on a surface of the primer layer in such a manner that the two sealing rings covers only a part of the surface of the primer layer; wherein each said sealing ring extends in a ring shape around the curved surface of the outer rim area of the inner surface of the substrate having the primer layer;

insert-molding injection of a connecting structure; after the step of applying the sealing ring layer, by using an insert-molding injection process, the connecting structure being formed by the insert-molding injection process and fixed onto the curved surface of the outer rim area of the inner surface of the substrate in such a manner that the connecting structure is located at a position having the primer layer and the two sealing rings and is in direct contact with both the primer layer and the two sealing rings; wherein the two sealing rings are in direct contact with both the primer layer and the connecting structure, such that the two sealing rings are located at the curved surface and sandwiched between and fully covered by adjoining surfaces of the primer layer and the connecting structure; and assembling at least one light source module; after the step of insert-molding injection, said at least one light source module being assembled onto at least one of the side surfaces of the substrate; the at least one light source module being capable of emitting light sideward toward the plastic layer, such that the light can travel laterally along the plastic layer; wherein the at least one light source module includes at least two LED light bars respectively disposed in a concave space on two opposite side surfaces of the plastic layer, making the LED light bars to be substantially received within the concave spaces of the plastic layer of the substrate;

wherein the connecting structure is capable of connecting to an external component, such that the substrate together with the at least one light source module can be connected to the external component through the connecting structure;

wherein said two sealing rings are for improving sealing effect between the curved surface of the outer rim area of the inner surface of the substrate having the primer layer and the connecting structure.

2. The manufacturing method of claim 1, wherein, during the step of providing the substrate, a coloring agent is added in the upper acrylic layer, so that the upper acrylic layer has a color and its light transmittance is between 5% and 70%; the coloring agent contains at least one of the following colors: black, red, blue, or green; the plastic layer is one of transparent, colorless or transparent-white and has a light transmittance greater than 90%; the lower acrylic layer is one of transparent, colorless or transparent-white, and the transmittance of the lower acrylic layer is greater than 90%.

3. The manufacturing method of claim 2, wherein, the light-guide sunroof assembly further comprises a plurality of light-guide microstructures disposed on at least one of the upper acrylic layer or the plastic layer of the substrate; the plurality of light-guide microstructures can guide the light traveling laterally along the plastic layer to emit downward out of the inner surface of the substrate; the light-guide microstructures are arranged in a predetermined pattern; when the at least one light source module emits light, the light at the positions of these light-guide microstructures will be guided downward and then emitted out from the inner surface of the substrate; the predetermined pattern of light emission formed by the arrangement of the light-guide microstructures can be displayed on the inner surface of the substrate.

4. The manufacturing method of claim 3, wherein, the plurality of light-guide microstructures includes a plurality of recesses; fluorescent powders are filled in the recesses of the plurality of light-guide microstructures in order to improve the luminous brightness of the predetermined pattern of light emitted by the arrangement of the plurality of light-guide microstructures.

5. The manufacturing method of claim 4, wherein, during the step of providing the substrate, a coated film layer is formed above the upper hard coating layer; the coated film layer comprises a cohesive layer, a UV-cut layer for providing anti-ultraviolet function and a wear-resistant layer; wherein:
the material of the cohesive layer comprises $SiO_2$;
the material of the UV-cut layer comprises $Ti_3O_5$ and UV absorber;
the material of the wear-resistant layer comprises $SiO_2$;
a top hard coating layer is further furnished on the top of the coated film layer.

6. The manufacturing method of claim 5, wherein:
the external component is a sunroof actuating mechanism of a car;
the connecting structure is made of hard plastic material; the hard plastic material of the connecting structure includes at least one of the following: polymethyl methacrylate, Polycarbonate, Acrylonitrile Butadiene Styrene, Polypyromellitimide, Polyethylene terephthalate, Polyethylene 2,6-naphthalene dicarboxylate, Polyethersulfone, and Polyimide;
the primer layer comprises one of the following: compounds of Amines and heterocyclic amines, Silane compounds, and Polyurethane, and is coated on the outer rim area of the inner surface of the substrate by precision wet coating process;
the material of the sealing ring includes one of the following: silicone and Polyurethane.

7. The manufacturing method of claim 6, wherein, during the step of providing the substrate, material of the substrate of the light-guide sunroof assembly is weakened at a predetermined area of the substrate, so that the substrate includes an easily breakable structure at the predetermined area; wherein the easily breakable structure is formed by one of the following:
a plurality of dots is densely arranged in the predetermined area of the substrate by mechanical or laser processing in order to create small cracks in the material at these densely arranged dots and makes the structure there weakened and easily broken, so as to form the easily breakable structure;
a ring-shaped dotted structure is formed in the predetermined area of the material inside the substrate by energy irradiation or a different material interface in order to make the structure of the ring-shaped dotted structure weakened and easily broken, so as to form the easily breakable structure; and a plurality of vertical dashed structures and horizontal dashed structures are formed inside the material of the substrate by energy irradiation in order to make the dashed structures weakened and easily broken, so as to form the easily breakable structure;

wherein, the easily breakable structure also has the function of directing light traveling in the substrate toward and emitting out from the inner surface of the substrate, such that a user can visually identify the location of the easily breakable structure.

* * * * *